United States Patent
Ansorge et al.

(10) Patent No.: US 7,451,618 B2
(45) Date of Patent: Nov. 18, 2008

(54) PROCESS FOR LIQUEFYING NATURAL GAS AND PRODUCING HYDROCARBONS

(75) Inventors: Joachim Ansorge, The Hague (NL); Robert Klein Nagelvoort, The Hague (NL); Adrianus Reinier Punt, The Hague (NL); Roy Widjaja, The Hague (NL)

(73) Assignee: Shell Oil Company, Houston, TX (US)

( * ) Notice: Subject to any disclaimer, the term of this patent is extended or adjusted under 35 U.S.C. 154(b) by 498 days.

(21) Appl. No.: 10/493,709

(22) PCT Filed: Oct. 25, 2002

(86) PCT No.: PCT/EP02/11326

§ 371 (c)(1),
(2), (4) Date: Apr. 23, 2004

(87) PCT Pub. No.: WO03/036208

PCT Pub. Date: May 1, 2003

(65) Prior Publication Data

US 2005/0020434 A1    Jan. 27, 2005

(30) Foreign Application Priority Data

Oct. 25, 2001    (EP)    ................... 01309081

(51) Int. Cl.
*F25J 1/00* (2006.01)
*C07C 27/00* (2006.01)
*C07C 27/06* (2006.01)

(52) U.S. Cl. .................. 62/611; 62/613; 518/702; 518/700

(58) Field of Classification Search .......... 62/611, 62/612, 613; 518/703, 700, 702
See application file for complete search history.

(56) References Cited

U.S. PATENT DOCUMENTS

| | | | |
|---|---|---|---|
| 2,683,158 A | 7/1954 | Brown et al. | 260/449.06 |
| 3,203,191 A | 8/1965 | French | 62/9 |
| 4,413,153 A | 11/1983 | Garwood et al. | 585/304 |
| 4,456,459 A | 6/1984 | Brundige, Jr. | 62/9 |
| 4,504,296 A | 3/1985 | Newton et al. | 62/31 |
| 4,545,795 A | 10/1985 | Liu et al. | 62/11 |
| 4,833,170 A | 5/1989 | Agee | 518/703 |
| 5,842,357 A * | 12/1998 | Siwajek et al. | 62/625 |
| 5,893,274 A | 4/1999 | Nagelvoort et al. | 62/613 |
| 6,225,359 B1 | 5/2001 | O'Rear et al. | 518/706 |
| 6,248,794 B1 * | 6/2001 | Gieskes | 518/700 |
| 6,289,692 B1 * | 9/2001 | Houser et al. | 62/613 |
| 6,323,247 B1 * | 11/2001 | Hall et al. | 518/700 |

2003/0019788 A1    1/2003    Benazzi et al. .......... 208/57

FOREIGN PATENT DOCUMENTS

| | | |
|---|---|---|
| EP | 0269297 | 6/1988 |
| EP | 0497425 | 8/1992 |
| EP | 0583837 | 2/1994 |
| EP | 0834046 | 4/1998 |
| GB | 1572899 | 8/1980 |
| GB | 2357140 | 6/2001 |
| WO | 91/15446 | 10/1991 |
| WO | 93/06041 | 4/1993 |
| WO | 94/21512 | 9/1994 |
| WO | 97/32172 | 9/1997 |
| WO | 98/11037 | 3/1998 |
| WO | 98/12118 | 3/1998 |
| WO | 98/36038 | 8/1998 |
| WO | 99/15483 | 4/1999 |

OTHER PUBLICATIONS

International Search Reported dated Apr. 17, 2003.
Oil and Gas Journal, vol. 69, No. 36, Sep. 6, 1971, pp. 86-90 "Partial Oxidation Grows Stronger in U.S.", C.J. Kuhre, et al.
Kirk Othmer Encyclopedia of Chemical Technology, 4th Edition, Vo. 7, "Encyclopedia f Chemical Technology", pp. 662-668.

* cited by examiner

*Primary Examiner*—William C Doerrler

(57) ABSTRACT

A process for the preparation of liquid hydrocarbons from a light hydrocarbonaceous feedstock in combination with a process for liquefying natural gas, which liquefaction process involves the steps of
(a) passing the natural gas at liquefaction pressure through the product side of a main heat exchanger;
(b) introducing cooled liquefied refrigerant at refrigerant pressure in the cold side of the main heat exchanger, allowing the cooled refrigerant to evaporate at the refrigerant pressure in the cold side of the main heat exchanger to obtain vaporous refrigerant at refrigerant pressure, and removing vaporous refrigerant from the cold side of the main heat exchanger;
(c) removing the liquefied gas at liquefaction pressure from the product side of the main heat exchanger;
(d) allowing the cooled liquefied gas to expand to a lower pressure to obtain expanded fluid;
(e) supplying the expanded fluid to a separator vessel;
(f) withdrawing from the bottom of the separator vessel a liquid product stream;
(g) withdrawing from the top of the separator vessel a gaseous stream;
(h) introducing the gaseous stream obtained in step (g) as feed and/or fuel in the process for the preparation of liquid hydrocarbons,
which process for the preparation of hydrocarbons involves converting a light hydrocarbonaceous feedstock into synthesis gas, followed by catalytic conversion of the synthesis gas into liquid hydrocarbons.

8 Claims, No Drawings

PROCESS FOR LIQUEFYING NATURAL GAS AND PRODUCING HYDROCARBONS

FIELD OF THE INVENTION

The present invention relates to a process for the preparation of liquid hydrocarbons from a light hydrocarbonaceous feedstock in combination with a process for liquefying natural gas.

BACKGROUND OF THE INVENTION

Processes for the liquefaction of natural gas are well known. In this respect reference is made to for example GB 1,572,899, U.S. Pat. No. 4,504,296, 4,545,795, 4,456,459, 3,203,191, EP 834,046 and WO 97/32172. Processes for the preparation of liquid hydrocarbons from light hydrocarbonaceous feedstock are also well known. In this respect reference is made to WO 98/11037, EP 583,837, EP 497,425, WO 94/21512, WO 97/12118, WO 91/15446, U.S. Pat. No. 4,833, 170, WO 99/15483 and EP 861,122.

An integrated process and plant for the production of liquid hydrocarbons from light hydrocarbonaceous feedstock, the liquefaction of natural gas and the production of electrical power has been described in WO 98/36038. However, in this process there is no integration between the LNG unit and the synfuel unit.

SUMMARY OF THE INVENTION

The present process, is directed to an integrated process for the preparation of liquefied natural gas and the preparation of liquid hydrocarbons from a light hydrocarbonaceous product. The integration results in a much larger production of liquefied natural gas for a given refrigeration compression power utilization. Such a production increase is not possible in the scheme described in WO 98/36038. The increased amount of liquefied natural gas is obtained by increasing the amount of end flash gas made in the liquefaction process and using this end flash gas as feed for the production of liquid hydrocarbons by means of conversion of the end flash gas into synthesis gas and catalytic conversion of the synthesis gas into liquid hydrocarbons (the Fischer Tropsch synthesis process) and/or using the end flash gas in the production of hydrogen and/or synthesis gas having a very high hydrogen/carbon monoxide ratio, and using this hydrogen or synthesis gas in the catalytic conversion of synthesis gas into liquid hydrocarbons. Further, an improved energy/power integration is obtained, especially by the use of off gasses, for instance off gasses from the hydrocarbon synthesis process, but also other hydrogen and/ or hydrocarbon gasses streams may be used, for the production of power needed in the natural gas liquefaction plant.

The present process, therefore, is directed to a process comprising:

(a) passing the natural gas at liquefaction pressure through a main heat exchanger having a product side and a cold side, wherein the natural gas enters the heat exchanger through the product side;

(b) introducing cooled liquefied refrigerant at refrigerant pressure in the cold side of the main heat exchanger, allowing the cooled refrigerant to evaporate at the refrigerant pressure in the cold side of the main heat exchanger to obtain vaporous refrigerant at refrigerant pressure, and removing vaporous refrigerant from the cold side of the main heat exchanger;

(c) removing the liquefied gas at liquefaction pressure from the product side of the main heat exchanger;

(d) allowing the cooled liquefied gas to expand to a lower pressure to obtain expanded fluid;

(e) supplying the expanded fluid to a separator vessel having a top and a bottom;

(f) withdrawing from the bottom of the separator vessel a liquid product stream;

(g) withdrawing from the top of the separator vessel a gaseous stream; and (h) introducing the gaseous stream obtained in step (g) as feed and/or fuel in the process for the preparation of liquid hydrocarbons, which process for the preparation of hydrocarbons involves converting a light hydrocarbonaceous feedstock into synthesis gas, followed by catalytic conversion of the synthesis gas into liquid hydrocarbons.

As indicated above, the advantage of the process of the present invention results in an increased liquefaction efficiency and hence to an incremental liquefied natural gas production for a given refrigeration compression power utilization. This increase in production may be up by 50% when compared with the production with minimum end gas flash production. Further, a considerable amount of energy saving may be obtained by using off gasses from the hydrocarbon manufacture (paraffin synthesis, hydrocracking, hydrotreatment etc.) for the generation of energy to be used in the liquefaction plant. An additional advantage is that in those cases in which the natural gas comprises (substantial) amounts of nitrogen or other light compounds as helium or neon, this nitrogen and/or light compounds will be removed from the liquefied natural gas in the end gas flash separation step.

In the liquefaction of natural gas, the liquefied natural gas is in the first instance obtained at a relatively high pressure, usually between 4.0 to 7.0 MPa. For storage and/or shipping the pressure of the natural gas is usually decreased to atmospheric pressure or a pressure slightly above atmospheric pressure, e.g. 0.10 to 0.15 MPa. Such a pressure reduction is often called an end flash reduction, resulting in end flash gas (sometimes also called "flash gas") and liquefied natural gas. An advantage of such an end flash reduction is that optional boiling components (e.g. nitrogen, neon and/or helium) are, at least partly, removed from the liquefied natural gas. The end flash gas is usually used as fuel gas, preferably for operation of the equipment of the liquefaction plant.

DETAILED DESCRIPTION OF THE INVENTION

A minimum-production of end flash gas is obtained when the liquefied natural gas is obtained by temperature of −161° C. at a pressure usually between 1.5 and 7.0 MPa. Typically natural gas is liquefied (i.e. condensed) at a pressure between 3.5 and 7.0 MPa and it may be further subcooled to around −161° C. at pressures between 1.5 and 7.0 Mpa. It is possible to cool the liquefied natural gas to a higher temperature, e.g. −150° C., or even up to −120° C., which results in a lower specific cooling duty, i.e. for a given refrigeration capacity more liquefied natural gas can be obtained. Upon pressure letdown to atmospheric pressure vapor will be generated. This pressure letdown may be carried out in several stages, e.g. one or two stages, the last one being operated at a pressure similar or close to the pressure of the liquefied natural gas storage tanks. A one vessel system is preferred. The vapor generated in the vessel is called end flash gas. The end flash gas and the liquefied gas are in equilibrium and both have the same temperature (−161° C.). The end gas flash may be used for the generation of energy or may be used in another useful disposal route, usually after a compression step. Prior to compression or other use, the cold contained in the end flash gas is usually recovered, e.g. by the refrigerant fluid, thereby enhancing the liquefaction efficiency further. The production of end flash gas is preferably heat integrated with the main heat exchanger, preferably in a cold box.

As indicated above, it has appeared very beneficial to use the end flash gas in the production of liquid hydrocarbons.

The end flash gas is mainly methane, but it may contain some light components, especially nitrogen, helium and/or neon.

In a preferred way the amount of end flash gas is between 5 and 35% of the amount of LNG produced, preferably between 10 and 30%, more preferably between 15 and 25%. The pressure at which the liquefied natural gas is made is usually between 1.5 and 7.0 MPa, preferably between 5.0 and 7.0 MPa. The temperature of the liquefied natural gas after the heat exchange is usually between −155 and −125° C., preferably between −150 and −130° C. The feed for the liquefied gas process may contain typically up to 15 vol % nitrogen based on total stream, usually between 0.1 and 12 vol %, often between 0.2 and 10 vol %.

The main heat exchanger may comprises any typical heat exchanger used in the LNG industry. It may comprise one large, single heat exchanger, or it may comprise two or more, e.g. three heat exchangers often grouped together in the one so-called cold box. It comprises for instance the heat exchangers used in mixed refrigerant cycle LNG plants, in cascade cycle LNG plants, or in expander cycle LNG plants, including variations on these cycles, as (propane) precooling. In this respect reference is made to Kirk Othmer, Enc. of Chem. Techn., fourth edition, Volume 7, p663-668.

In a preferred embodiment inerts, especially nitrogen, are removed from the end flash gas, for instance in a stripper or distillation unit. This unit is preferably heat integrated with the main heat exchanger, preferably in one cold box. This will improve the efficiency of the preparation of liquid hydrocarbons.

In another preferred embodiment the pressure relief of the liquid natural gas is carried out by means of an expander.

Several methods may be used for the conversion of end flash gas into synthesis gas. Preferred are (catalytic) partial oxidation, steam methane reforming, or (integrated) combinations of these two processes. Usually the end flash gas will be mixed with a light hydrocarbonaceous stream. This hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, especially comprises at least 60 v/v percent methane, preferably at least 7.5 percent, more preferably 90 percent. Very suitably natural gas or associated gas is used. Suitably, any sulphur in the feedstock is removed.

The partial oxidation of the end flash gas/light hydrocarbonaceous feed stream, producing a mixture of carbon monoxide and hydrogen, may take place in an oxidation unit according to various established processes. These processes include the Shell Gasification Process. A comprehensive survey of this process can found in the Oil and Gas Journal, Sep. 6, 1971, pp. 86-90.

The oxygen containing gas may by air (containing about 21 percent oxygen), or oxygen enriched air, suitably containing up to 100 percent of oxygen, preferably containing at least 60 volume percent oxygen, more preferably at least 80 volume percent, more preferably at least 98 volume percent of oxygen. Oxygen enriched air may be produced via cryogenic techniques, but may also be produced by a membrane based process, e.g. the process as described in WO 93/06041.

To adjust the $H_2/CO$ ratio in the syngas, carbon dioxide and/or steam may be introduced into the partial oxidation process. Preferably up to 15% volume based on the amount of syngas, preferably up to 8% volume, more preferably up to 4% volume, of either carbon dioxide or steam is added to the feed. As a suitable steam source, water produced in the hydrocarbon synthesis may be used. As a suitable carbon dioxide source, carbon dioxide from effluent gasses may be used. The $H_2/CO$ ratio of the syngas is suitably between 1.5 and 2.3, preferably between 1.8 and 2.1.

If desired, additional amounts of hydrogen and/or synthesis gas having a high hydrogen/carbon monoxide ratio may be made by steam methane reforming, preferably in combination with the water shift reaction. Any carbon monoxide and carbon dioxide produced together with the hydrogen may be used in the hydrocarbon synthesis reaction or recycled to increase the carbon efficiency.

The percentage of end flash gas/light hydro-carbonaceous feed stream which is converted in the first step of the process of the invention is suitably 50-99% by weight and preferably 80-98% by weight, more preferably 85-96% by weight.

The gaseous mixture, comprising predominantly hydrogen carbon monoxide and optionally nitrogen, is contacted with a suitable catalyst in the catalytic conversion stage, in which the normally liquid hydrocarbons are formed. Suitably at least 70 v/v % of the syngas is contacted with the catalyst, preferably at least 80%, more preferably at least 90%, still more preferably all the syngas. The conversion may be carried out in one or more stages.

The (normally liquid) hydrocarbons produced in the hydrocarbon synthesis process of the invention are suitably $C_{3-200}$ hydrocarbons, more suitably $C_{4-120}$ hydrocarbons, especially $C_{5-80}$ hydrocarbons, more especially, after hydrocracking, $C_{6-20}$ hydrocarbons, or mixtures thereof. These hydrocarbons or mixtures thereof are liquid at temperatures between 5 and 30° C. (1 bar), especially at 20° C. (1 bar), and usually are paraffinic of nature, while up to 20 wt %, preferably up to 5 wt %, of either olefins or oxygenated compounds may be present.

The catalysts used in the conversion unit for the catalytic conversion of the mixture comprising hydrogen and carbon monoxide into hydrocarbons are known in the art and are usually referred to as Fischer-Tropsch catalysts. Catalysts for use in the Fischer-Tropsch hydrocarbon synthesis process frequently comprise, as the catalytically active component, a metal from Group VIII of the Periodic Table of Elements. Particular catalytically active metals include ruthenium, iron, cobalt and nickel. Cobalt is a preferred catalytically active metal.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica and titania.

The amount of catalytically active metal on the carrier is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium, lanthanum, cerium, titanium, zirconium, hafnium, thorium, uranium, vanadium, chromium and manganese are most suitable promoters. Particularly preferred metal oxide promoters for the catalyst are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination at a temperature of generally from 350 to 750° C., preferably a temperature in the range of from 450 to 550° C. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200 to 350° C.

The catalytic conversion process may be performed in the conversion unit under conventional synthesis conditions known in the art. Typically, the catalytic conversion may be effected at a temperature in the range of from 100 to 600° C., preferably from 150 to 350° C., more preferably from 180 to 270° C. Typical total pressures for the catalytic conversion process are in the range of from 1 to 200 bar absolute, more preferably from 10 to 70 bar absolute. In the catalytic conversion process mainly (at least 70 wt %, preferably 80 wt %) $C_5+$ hydrocarbons are formed.

Preferably, a Fischer-Tropsch catalyst is used, which yields substantial quantities of paraffins, more preferably substantially unbranched paraffins. A part may boil above the boiling point range of the so-called middle distillates. A most suitable catalyst for this purpose is a cobalt-containing Fischer-Tropsch catalyst. The term "middle distillates", as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150 to about 360° C.

The higher boiling range paraffinic hydrocarbons, if present, may be isolated and subjected in an optional hydrocracking unit to a catalytic hydrocracking which is known per se in the art, to yield the desired middle distillates. The catalytic hydrocracking is carried out by contacting the paraffinic hydrocarbons at elevated temperature and pressure and in the presence of hydrogen with a catalyst containing one or more metals having hydrogenation activity, and supported on a carrier. Suitable hydrocracking catalysts include catalysts comprising metals selected from Groups VIB and VIII of the Periodic Table of Elements. Preferably, the hydrocracking catalysts contain one or more noble metals from group VIII. Preferred noble metals are platinum, palladium, rhodium, ruthenium, iridium and osmium. Most preferred catalysts for use in the hydro-cracking stage are those comprising platinum.

The amount of catalytically active metal present in the hydrocracking catalyst may vary within wide limits and is typically in the range of from about 0.05 to about 5 parts by weight per 100 parts by weight of the carrier material.

Suitable conditions for the optional catalytic hydrocracking in a hydrocracking unit are known in the art. Typically, the hydrocracking is effected at a temperature in the range of from about 175 to 400° C. Typical hydrogen partial pressures applied in the hydrocracking process are in the range of from 10 to 250 bar.

In a further preferred process, the off gas of the Fischer Tropsch reaction may be used for the generation of energy for the liquefaction process. Preferably at least part of the off gas is used, especially at least 60%, preferably at least 90% is used. In addition, also off gas of any hydrocracking operation may be used for the generation of power to be used in the liquefaction process.

A still further improvement is obtained by using the energy obtained in the catalytic oxidation process for the generation of synthesis gas and/or the Fischer Tropsch reaction for the liquefaction of natural gas. Both processes are highly exothermic, and usually the excess heat is removed by steam cooling. The steam thus generated may be used for the production of power to be used in the liquefaction process. Part of the energy may also be used in the hydrocarbon synthesis plant, but certainly the excess may be used in the liquefaction process.

In the case that only a limited amount of end flash gas would be available, the preference is given to use it in the manufacturing (steam methane reforming) of hydrogen and/or synthesis gas having a high hydrogen/carbon monoxide ratio. It is preferred to use the end flash gas first as feed for the steam methane reforming process, and, when sufficient gas is available, also as fuel for the process, usually to replace off gas from the hydrocarbon synthesis reaction. When more end flash gas is available, or in the case that it is not desired to use it as fuel for the steam methane reforming process, this can be used in the preparation of synthesis gas for the hydrocarbon synthesis reaction.

For a liquefaction plant designed to produce 4 mpta LNG the amount of end flash gas could be between 0.4 and 1.2 mpta. Such an amount of end flash gas may result in an increase of LNG production between 20 to 50% extra LNG. Export to a hydrocarbon synthesis plant of sufficient size, using a partial oxidation reaction for the production of synthesis gas, will be sufficient for the required hydrogen production of such a plant as well as to partially replace the feed for the partial oxidation reaction. The energy generated by the catalytic partial oxidation and the hydrocarbon synthesis reaction (steam and off gas conversion) will be sufficient to supply the required power to the liquefaction plant and the hydrocarbon synthesis plant.

We claim:

1. A process for the preparation of liquid hydrocarbons from a light hydrocarbonaceous feedstock in combination with a process for liquefying natural gas, which liquefaction process comprises the steps of:
    (a) passing the natural gas at liquefaction pressure through a main heat exchanger having a product side and a cold side, wherein the natural gas enters the heat exchanger through the product side;
    (b) introducing cooled liquefied refrigerant at refrigerant pressure in the cold side of the main heat exchanger, allowing the cooled refrigerant to evaporate at the refrigerant pressure in the cold side of the main heat exchanger to obtain vaporous refrigerant at refrigerant pressure, and removing vaporous refrigerant from the cold side of the main heat exchanger;
    (c) removing the liquefied gas at liquefaction pressure from the product side of the main heat exchanger;
    (d) allowing the cooled liquefied gas to expand to a lower pressure to obtain expanded fluid;
    (e) supplying the expanded fluid to a separator vessel having a top and a bottom;

(f) withdrawing from the bottom of the separator vessel a liquid product stream;

(g) withdrawing from the top of the separator vessel a gaseous stream; and (h) introducing the gaseous stream obtained in step (g) as feed and/or fuel in the process for the preparation of liquid hydrocarbons, which process for the preparation of hydrocarbons comprises converting a light hydrocarbonaceous feedstock into synthesis gas, followed by catalytic conversion of the synthesis gas into liquid hydrocarbons, and in which process the gaseous stream which is used in step (h) is used in the production of hydrogen to be used in the production of liquid hydrocarbons and in which the hydrogen is purified by means of PSA.

2. The process of claim 1, in which the gaseous stream is used as feed and/or as fuel in the production of hydrogen by means of steam methane reforming.

3. The process of claim 1, in which the gaseous stream which is used in step (h) is used in the production of synthesis gas to be used in the production of liquid hydrocarbons.

4. The process of claim 3, in which the synthesis gas is made by partial oxidation.

5. The process of claim 3, in which the synthesis gas is made by steam methane reforming, the gaseous stream being the feed for the reforming, or in which the synthesis gas is made by a combination of steam methane reforming and partial oxidation.

6. The process of claim 1, in which the separator vessel is provided with internals in order to improve the separation of low boiling point components and the liquid products stream.

7. The process of claim 1, in which any off gas from the hydrocarbon synthesis is used for the production of power to be used in the liquefaction process.

8. The process of claim 1, in which surplus energy which is produced in the partial oxidation process and/or the hydrocarbon synthesis process is used for the production of power to be used in the liquefaction process.

\* \* \* \* \*